United States Patent [19]
Rossi

[11] Patent Number: 6,009,500
[45] Date of Patent: Dec. 28, 1999

[54] REPLACEMENT OF ERRONEOUS FIRMWARE IN A REDUNDANT NON-VOLATILE MEMORY SYSTEM

[75] Inventor: Markku J. Rossi, Houston, Tex.

[73] Assignee: Compaq Computer Corporation, Houston, Tex.

[21] Appl. No.: 08/950,327

[22] Filed: Oct. 14, 1997

Related U.S. Application Data

[63] Continuation of application No. 08/474,739, Jun. 7, 1995, abandoned.

[51] Int. Cl.$^6$ .................................................. G06F 11/16
[52] U.S. Cl. ........................... 711/162; 711/161; 714/6; 714/7; 714/8; 714/54; 714/765
[58] Field of Search ................... 395/182.03, 182.04, 395/489, 182.01, 182.06, 182.05; 371/10.2, 10.3; 364/DIG. 1; 711/170, 162, 161; 714/2, 5, 6, 7, 8, 54, 710, 763, 765

[56] References Cited

U.S. PATENT DOCUMENTS

| | | |
|---|---|---|
| 4,099,256 | 7/1978 | Draper . |
| 4,450,559 | 5/1984 | Bond et al. . |
| 4,564,922 | 1/1986 | Muller ..................................... 711/161 |
| 4,829,520 | 5/1989 | Toth ............................................ 714/5 |
| 4,851,994 | 7/1989 | Toda et al. . |
| 5,109,521 | 4/1992 | Culley . |
| 5,113,391 | 5/1992 | Gupta et al. . |
| 5,161,157 | 11/1992 | Owen et al. ................................. 714/7 |
| 5,200,959 | 4/1993 | Gross et al. ............................ 714/723 |
| 5,210,854 | 5/1993 | Beaverton et al. . |
| 5,212,693 | 5/1993 | Chao et al. ............................... 714/10 |
| 5,270,974 | 12/1993 | Reddy . |
| 5,303,192 | 4/1994 | Baba . |
| 5,303,198 | 4/1994 | Adachi et al. . |
| 5,321,840 | 6/1994 | Ahlin et al. . |
| 5,341,175 | 8/1994 | Koz . |
| 5,341,498 | 8/1994 | Connor et al. . |
| 5,361,343 | 11/1994 | Kosonocky et al. . |
| 5,361,373 | 11/1994 | Gilson . |
| 5,369,606 | 11/1994 | Hessel . |
| 5,369,754 | 11/1994 | Fandrich et al. . |
| 5,493,674 | 2/1996 | Mizutani et al. .......................... 714/11 |
| 5,530,938 | 6/1996 | Akasaka et al. ........................ 711/103 |

*Primary Examiner*—B. James Peikari
*Attorney, Agent, or Firm*—Jenkens & Gilchrist P.C.

[57] ABSTRACT

The original firmware of a computing device is stored in a fixed non-volatile ROM-type memory while any subsequently issued replacement firmware correcting or upgrading erroneous firmware contained within the original firmware is stored in a reprogrammable EEPROM-type non-volatile memory. The locations in the fixed and reprogrammable memories storing the corresponding erroneous and replacement firmware, respectively, are identified in a data table that is also stored in the reprogrammable memory. A field programmable gate array connected to the reprogrammable memory uses the data table to identify computing device requests to the fixed memory for erroneous firmware and in response thereto inhibit output of erroneous firmware. The gate array further uses the data table to access the reprogrammable memory and output corresponding replacement firmware in substitution for the device requested original, but erroneous, firmware.

5 Claims, 2 Drawing Sheets

REPLACEMENT OF ERRONEOUS FIRMWARE IN A REDUNDANT NON-VOLATILE MEMORY SYSTEM

This application is a continuation of application Ser. No. 08/474,739, filed on Jun. 07, 1995 abandoned upon the filing hereof.

BACKGROUND OF THE INVENTION

1. Technical Field of the Invention

The present invention relates to computing device memory systems and, in particular, to a method and apparatus for economically correcting and updating firmware stored in a computing device memory system.

2. Description of the Related Art

General purpose digital computers and other processing devices (hereinafter "computing devices") utilize a wide variety of computer programs to perform various tasks. A computer program comprises a series of instructions or statements arranged in a specific sequence and written in a language executable by the processor of the computing device to achieve a certain result. Such programs include, to name just a few types, operating systems, compilers and applications.

Computer programs may be implemented in either software or firmware, each of which is executed by the hardware of the computing device. Software, as used herein, refers to those computer programs whose instructions and/or data are stored and maintained in the computing device only for so long as power continues to be supplied thereto. Such computer programs are typically semi-permanently stored on magnetic disc and downloaded for volatile storage in a random access memory (RAM) when needed by the computing device. Programming stored in this fashion must be reloaded into the RAM of the computing device each time there is a power interruption.

Firmware, on the other hand, as used herein, refers to those computer programs whose instructions and/or data are stored and maintained permanently in the computing device without the need for the continued application of power. These computer programs are typically stored in non-volatile read only memory (ROM), programmable read only memory (PROM) or erasable programmable read only memory (EPROM). Use of a non-volatile memory obviates the need to reload the programming into the computing device in the event of a power loss or turn-off.

Unlike software, which is relatively easily corrected or updated (for example, by means of modifying or replacing the magnetic media upon which the software is stored), once firmware is stored in the fixed ROM of the computing device it cannot be written over without removing the integrated circuit chip in which the firmware is stored or replacing the circuit board. Thus, in order to correct programming errors or install programming updates issued after the computing device is placed into general public use, the computing device itself must be returned to or serviced by a representative of the manufacturer. The replacement of the integrated circuit chip or circuit board is, however, inconvenient, expensive and time consuming. Considerable effort has accordingly been expended in discovering ways to correct and update device firmware without the need for chip replacement or hand-on access by the manufacturer to the computing device.

The development of electrically erasable programmable read only memory (EEPROM) has obviated to some extent the need for replacing memory chips storing firmware when programming corrections or upgrades are required. The EEPROM comprises a read only memory device whose individual data storage locations (addresses) are erasable and reprogrammable by applying certain electrical signals to the chip. New firmware can thus be stored in the chip without removing the chip from the computing device. Unfortunately, an EEPROM is both much less dense and as much as four times more expensive than a conventional non-volatile ROM, PROM or EPROM chip. More chips (occupying valuable circuit board space) at a significant increase in overall cost are therefore required to provide equivalent computing device storage capacity in comparison to that provided by conventional non-volatile storage devices.

As a result, computing device manufacturers typically include in their memory systems a combination of the various types of available non-volatile memory devices for storing firmware. Portions of the firmware most susceptible to correction or upgrade are stored in the included EEPROM chips, with the remainder of the firmware permanently stored in the conventional non-volatile ROM, PROM or EPROM chips. This solution overcomes to a degree the density, space and cost concerns mentioned above while advantageously providing for some firmware correction and upgrade capability. However, any corrections or updates in that portion of the firmware stored in the conventional ROM, PROM or EPROM chips would still require replacement of the chip or the circuit board.

As the density of EEPROM chips has steadily increased and the cost per chip dropped due to improved semiconductor manufacturing techniques, more and more of the computing device firmware is being stored using EEPROMs rather than conventional non-volatile memory chips. However, fixed ROM is still much more economical than EEPROM. In fact, it is now common for all computing device firmware to be stored in EEPROM. While this does allow for all of the included firmware to be corrected or upgraded in an efficient and convenient manner, significant concerns are being raised over whether firmware integrity can be maintained within this type of storage architecture. The addition of safeguards to the computing device has been proposed for preventing the inadvertent or unintentional corruption of the stored firmware. Such safeguards, however, significantly add to the cost of the computing device.

Accordingly, it now appears that there is some financial and operational benefit to the prior art architecture wherein the storage of firmware is provided by conventional non-volatile ROM-type memories. There continues to be a need, however, in such an architecture for correcting or upgrading of the firmware stored therein without requiring the replacement of either the non-volatile memory or circuit board.

SUMMARY OF THE INVENTION

The computing device memory system of the present invention includes a fixed non-volatile memory for storing computing device original firmware. The fixed memory is supplemented with a reprogrammable non-volatile memory for storing corrections and updates to any erroneous or outdated firmware contained within the original firmware stored in the fixed memory. A table stored in the reprogrammable memory identifies the locations in the fixed memory of the erroneous or outdated firmware as well as the locations in the reprogrammable memory of the corresponding replacement firmware. A memory access controller connected to the reprogrammable memory and having access to the stored table is configured through its programming to respond to a request from the computing device for access to erroneous or outdated firmware in the fixed memory by instead accessing the corresponding replacement firmware in the reprogrammable memory. The memory access controller further facilitates the reprogramming of the reprogrammable memory to store updates to the table and the replacement firmware accounting for subsequently discovered erroneous or outdated firmware within the original firmware. The need to replace fixed memory in response to the discovery of erroneous or outdated firmware within the original device firmware is accordingly obviated.

BRIEF DESCRIPTION OF THE DRAWINGS

A more complete understanding of the computing device memory system of the present invention may be obtained by reference to the following Detailed Description when taken in conjunction with the accompanying Drawings wherein.

DETAILED DESCRIPTION OF EMBODIMENTS

Figure 1:
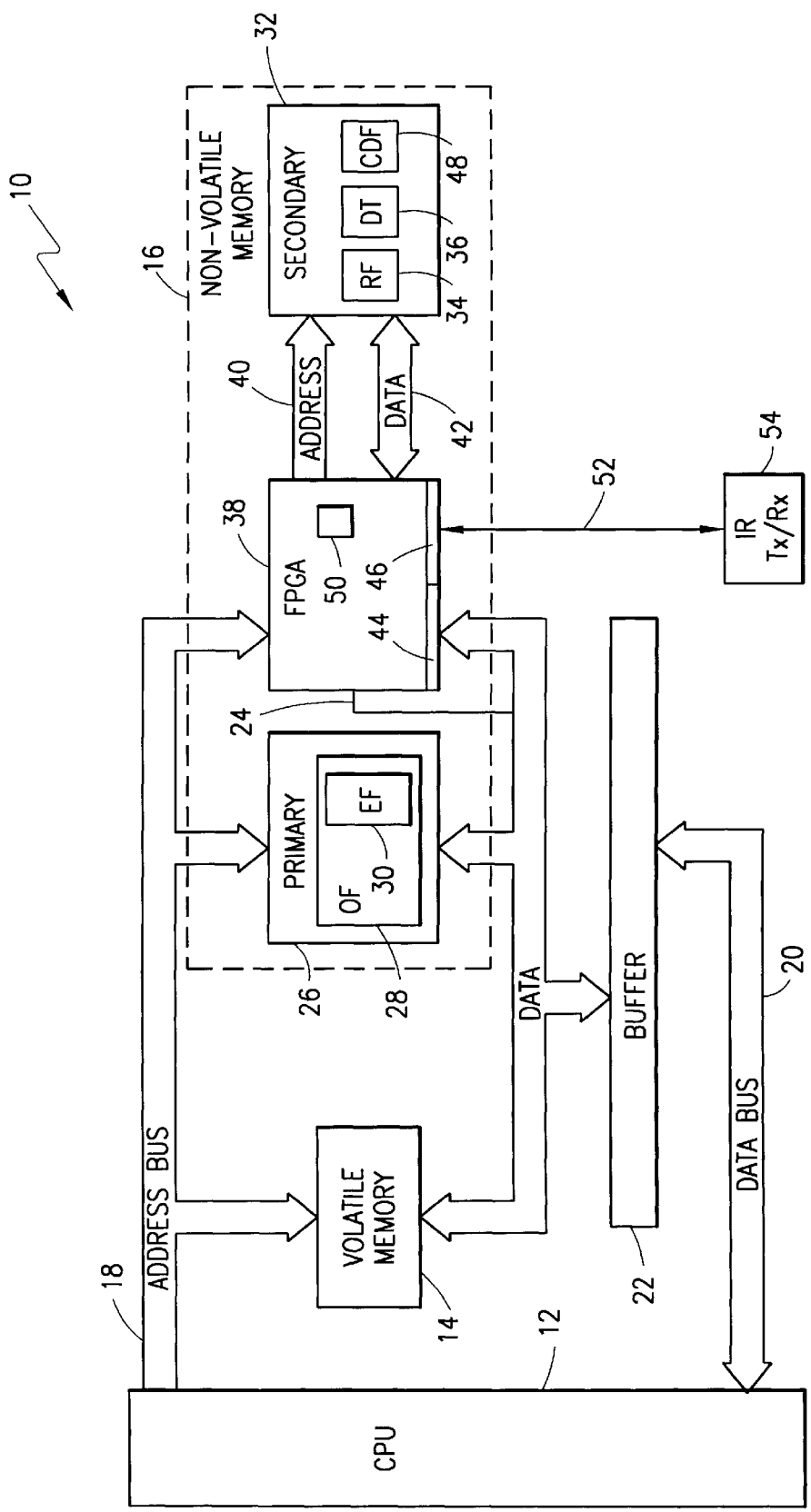
FIG. 1 is a block diagram of a computing device including the memory system of the present invention.

Referring now to FIG. 1, there is shown a block diagram of a computing device 10 comprising a central processing unit 12, a volatile memory system 14 and a non-volatile memory system 16. The central processing unit 12 is connected to the volatile memory system 14 and the non-volatile memory system 16 via an address bus 18 and a data bus 20 that facilitate central processing unit storage of programming and data in and the retrieval of programming and data from the memory systems 14 and 16. Connected between the data bus 20 and the memory systems 14 and 16 is a data bus buffer 22. The buffer 22 functions as a temporary holding area for storing programming and data transmitted over the data bus 20 on the way to and from the memory systems 12 and 14. The holding or releasing of programming and data from the buffer 22 is triggered by the state of a data ready line 24 of the data bus 20.

The volatile memory system 14 comprises conventional random access memory (RAM) for storing software that when executed performs a desired function. In this connection, the term "software" refers to both programming and/or data. The software is semi-permanently stored on a recording media and loaded into the device 10 from an external source such as a disc or tape drive. To retrieve software from or store software in the volatile memory system 14, the central processing unit 12 addresses a desired location in the volatile memory system using the address bus 18. The software being stored or retrieved by the central processing unit 12 is then placed in the buffer 22 and the data ready line 24 changed from one state to another signaling the release of the held software for storage in the volatile memory system 14 or access by the central processing unit 12 as is appropriate.

The non-volatile memory system 16 of the present invention includes a primary non-volatile data storage device 26 for storing firmware. In this connection, the term "firmware" refers to both programming and/or data. Firmware is typically loaded into a computing device 10 at the time of its manufacture. The primary data storage device 26 preferably comprises a fixed-type non-volatile data store like a read only memory (ROM), programmable read only memory (PROM) or erasable programmable read only memory (EPROM). The address bus 18 and the data bus 20 (via the buffer 22) are also connected to the primary data storage device 26. To retrieve firmware from the primary data storage device 26 of the non-volatile memory system 16, the central processing unit 12 addresses a desired location in the primary data storage device using the address bus 18. The firmware being retrieved by the central processing unit 12 is then placed in the buffer 22 and the data ready line 24 is changed from one state to another (e.g., from "down" to "up") signaling the release of the held firmware for access by the central processing unit 12 using data bus 20.

The firmware stored by the primary data storage device 26 of the memory system 16 of the present invention typically comprises the original, factory loaded firmware (OF) 28 for the computing device 10. It is not an uncommon occurrence that the original firmware 28 loaded into the device 10 will subsequently be discovered to include programming or data errors (erroneous firmware—EF—30) that adversely affect device operation, or that has simply been improved upon (i.e., EF also includes outdated firmware). Unfortunately, due to the fixed, non-volatile nature of the primary data storage device 26, it is not possible to alter, change, delete or otherwise modify the originally loaded firmware 28 and thus account for erroneous firmware 30. The historical solution to this problem was to have a technician replace the integrated circuit chips comprising the non-volatile memory or replace the entire circuit board for the device 10. For reasons of convenience, efficiency and reduced expense, it is desirable that a solution other than replacement be made available to both users and manufacturers to facilitate the correction and upgrading of original firmware that is stored in non-volatile memories.

The non-volatile memory system 16 of the present invention addresses the foregoing firmware correction and upgrade limitation by further including a secondary non-volatile data storage device 32 for storing replacement firmware (RF) 34 accounting for the erroneous firmware 30 discovered within the original firmware 28 stored in the primary data storage device 26. The secondary data storage device 32 preferably comprises a reprogrammable-type non-volatile data store like an electrically erasable programmable read only memory (EEPROM) or a flash memory [i.e., an increasingly recognized low cost, non-volatile, in-system programmable solid state memory, discussed in detail (although definitional standards have not been firmly established) in such articles as "Flash Memory Heads Towards Mainstream", Microprocessor Report, Vol. 8, No. 7, page 19 (May 30, 1994)]. Because the secondary data storage device 32 comprises reprogrammable memory, replacement firmware 34 may be downloaded to the memory system 16 when necessary and in response to the discovery of erroneous firmware 30 within the firmware 28 originally stored in the fixed primary data storage device 26.

A record comprising a data table (DT) 36 is kept by the system 16 of the addresses in the primary data storage device 26 where the erroneous firmware 30 is located. The data table 36 further records the addresses in the secondary non-volatile data storage device 32 where the corresponding replacement firmware 34 is located. This information may be stored in the data table 36 in any one of a number of known ways and formats, including the use of linked lists and other programming and/or database techniques.

The non-volatile memory system 16 of the present invention further includes field programmable gate array (FPGA) 38 functioning to control central processing unit 12 access to the firmware stored in the non-volatile memory system 16. The field programmable gate array 38 is connected to the secondary data storage device 32 via an address bus 40 and a data bus 42 and is further connected to the central processing unit 12 via the address bus 18 (to receive original firmware 28 access requests) and to the data bus 20 (for delivering replacement firmware 34 in place of erroneous firmware 30). The connection of the gate array 38 to the data bus 20 is made through the buffer 22 via a parallel data port 44. The field programmable gate array 38 also includes a serial data port 46 through which data may be received from and transmitted to storage in either the gate array or the secondary data storage device 32.

The field programmable gate array 38 is a general purpose, programmable device of conventional random access memory (RAM) design such as that disclosed in U.S. Pat. No. 4,870,302 issued to Freeman. The gate array 38 provides a flexible architecture of input/output, logic and routing resources (not shown). These resources are interconnected in accordance with user defined device programming to implement a user-configurable integrated circuit for performing specific functions. In this case, the gate array 38 is programmed to control access to firmware stored in the memory device 16 and, in particular, effectuate the substitution of replacement firmware 34 for any erroneous firmware 30 requested by the central processing unit 12. More detailed information concerning the structure, operation and technical features of field programmable gate arrays may be obtained from a review of the publication "The Programmable Gate Array Data Book" (XILINX, 1992) and the previously mentioned U.S. patent to Freeman.

The user defined device programming for controlling the operation of the field programmable gate array 38 is stored as a configuration data file (CDF) 48 in the secondary data storage device 32. The field programmable gate array 38 is programmed by downloading the configuration data file 48 over the data bus 42 from the secondary data storage device 32 into a configuration memory array 50. Because the field programmable gate array 38 is a RAM-based device, the downloading of the configuration data file 48 into the array 50 must be performed each time power is first applied to the device 10 (i.e., at turn on).

The replacement firmware 34, table 36 and configuration data file 48 are loaded into the secondary data storage device 32 for storage therein whenever necessary. Normally, this operation will be performed each time erroneous firmware 30 is discovered. The loading of all or part of this data may accomplished in a number of ways. First, the data may be received by the processing device 10 over the data bus 20 in parallel format, loaded into the buffer 22, received at parallel port 44, and transmitted by the field programmable gate array 38 over data bus 42 into the appropriate storage locations within the secondary data storage device 32. Alternatively, the data may be received by the field programmable gate array 38 via a serial data transmission over link 52 and through serial data port 46, and then stored in the secondary data storage device 32. Communication by the device 10 using the link 52 and port 46 with the external source to load the replacement firmware 34, table 36 and configuration data file 48 may be conveniently effectuated by using an infrared transmitter 54.

Figure 2:
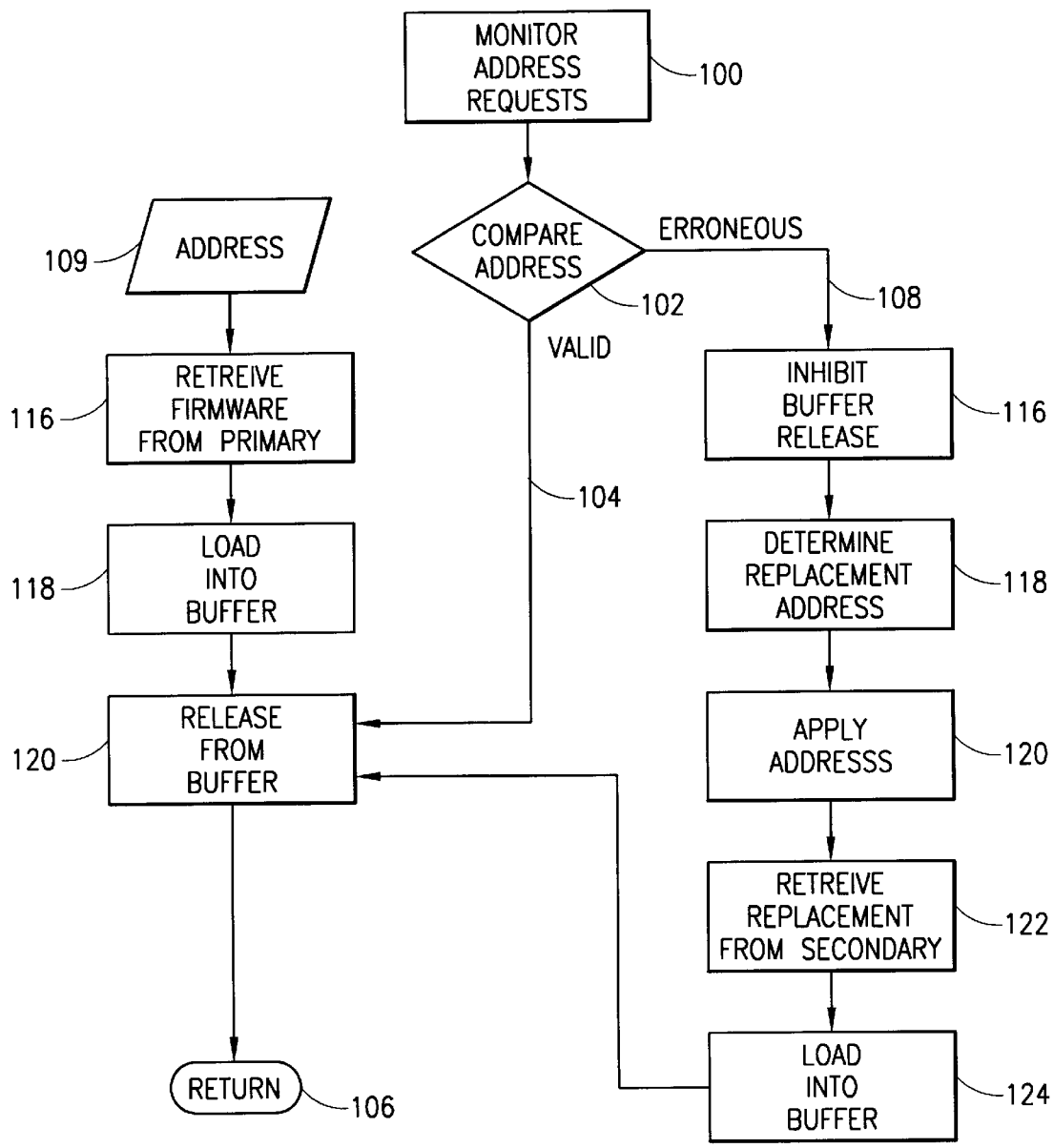
FIG. 2 is a flow diagram illustrating the operation of the memory system of the present invention.

Reference is now also made to FIG. 2 wherein there is shown a flow diagram illustrating the operation of the memory system 16. The programmed configuration data file 48 when executed by the field programmable gate array 38 controls the functional operation of the gate array to monitor the address bus 18 (step 100) for the purpose of detecting instances wherein the central processing unit 12 requests access to erroneous firmware 30 stored in the primary data storage device 26. This detection is made by comparing in step 102 the address applied to the address bus 18 by the central processing unit 12 to the list of addresses in the data table 36 (stored in the secondary data storage device 32) identifying the erroneous firmware 30 stored in primary data storage device 26. If the central processing unit 12 is requesting valid original firmware 28 (flow 104), then the process moves to step 106 and returns to step 100 to again monitor the address bus 18.

Regardless of whether the address applied to the bus 18 is for valid firmware (Flow 104) or erroneous firmware (flow 108), the applied address is received by the primary data storage device 26. The requested original firmware 28 is then retrieved from the primary data storage device 26 (step 110) and loaded into the data buffer 22 (step 112). A subsequent change of the data ready line 24 from "down" to "up" signals the release (step 114) of the requested original firmware 28 for transmission to the central processing unit 12 via data bus 20.

While the primary data storage device 26 outputs original firmware 28, and in response to a request in step 102 for access to erroneous firmware 30 (flow 108), the field programmable gate array 38 keeps the data ready line 24 "down" to inhibit release (step 116) of any erroneous firmware 30 that is loaded into the buffer 22 from the primary data storage device 26 in step 112. The gate array 38 then determines from the data table 36 the address in the secondary data storage device 32 where the replacement firmware 34 corresponding to the requested erroneous firmware 30 is stored (step 118). The determined address is then applied to address bus 40 (step 120) and the replacement firmware 34 is retrieved from the secondary data storage device 32 via data bus 42 (step 122). The retrieved replacement firmware 34 is then loaded by the field programmable gate array 38 into the data buffer 22 (step 124) in substitution for the requested erroneous firmware 30 loaded in step 112. The data ready line 24 is then changed to from "down" to "up" to signal a release (step 114) of the replacement firmware 30 from buffer 22 for transmission to the central processing unit 12 via data bus 20.

The actions of the field programmable gate array 38 to detect requests for erroneous firmware 30 and thereafter access and substitute replacement firmware 34 occur in a transparent manner. By "transparent" it is meant that the processor 12 does not know whether the firmware received via the data bus 20 originated in the primary data storage device 26 (as original firmware 28) or the secondary data storage device 32 (or replacement firmware 34). One drawback of the foregoing operation performed by the gate array 28 is the delay caused by the testing of the applied address and the substitution of the replacement firmware 34 for the erroneous firmware 30 by the gate array 38. However, as long as the proportion of replacement firmware 34 to original firmware 28 remains relatively small, this delay should not adversely affect device 10 performance. The functional frequency of the gate array can however be 100 MHz or more and the address comparison process can include as much parallelism as possible with the amount of available gates in the circuit, to speed up the address comparison process.

Although a preferred embodiment of the method and system of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A non-volatile memory system for a computing device including a first address bus and a first data bus, each of which buses is coupled to a primary non-volatile memory, the non-volatile memory system comprising:

a secondary non-volatile memory for storing of replacement firmware, said replacement firmware accounting for erroneous firmware contained within the primary non-volatile memory;

an updatable data structure in said secondary non-volatile memory, comprising a first plurality of addresses and a corresponding second plurality of addresses, said first plurality of addresses for pointing to the location of said erroneous firmware within the primary non-volatile memory and said corresponding second plurality of addresses for pointing to the location of said replacement firmware within said secondary non-volatile memory; and a memory access controller connected to the first address bus and the first data bus and further connected to said secondary non-volatile memory via a second address bus and a second data bus, said memory access controller configured at least in part by a configuration data program stored in a portion of said secondary non-volatile memory, said memory access controller operating to: detect requests on the first address bus for access to erroneous firmware stored in the primary non-volatile memory; access; via said second address and data buses, the replacement firmware stored in said secondary non-volatile memory; and output the accessed replacement firmware on the first data bus, "wherein the non-volatile memory system includes a parallel port and a serial port, wherein said configuration data program is received by the non-volatile memory system in at least one of the following ways:

(a) in parallel over a data bus connection to the parallel port, (b) in series over a serial link to the serial port."

2. The non-volatile memory system as in claim 1, wherein said secondary non-volatile memory comprises a reprogrammable read only memory type memory device.

3. The non-volatile memory system as in claim 1, wherein said memory access controller further includes means for storing updates to said configuration data program.

4. The non-volatile memory system as in claim 1, wherein said memory access controller further includes means for reprogramming said secondary non-volatile memory to store updates to the replacement firmware accounting for subsequent identifications of erroneous firmware.

5. The non-volatile memory system as in claim 1, further including a data buffer connected to both the primary non-volatile memory and said memory access controller to receive and hold retrieved firmware and further connected to the first data bus, said memory access controller further operating to inhibit release of firmware from said data buffer to the first data bus until after said memory access controller accessing of the replacement firmware, if necessary, from said secondary non-volatile memory.

* * * * *